May 24, 1966 A. B. NEWTON 3,252,504

THERMOELECTRIC AIR CONDITIONING SYSTEMS

Filed Dec. 30, 1964 3 Sheets-Sheet 1

INVENTOR:
ALWIN B. NEWTON
BY Thomas B. Hunter
ATTORNEY

May 24, 1966 A. B. NEWTON 3,252,504

THERMOELECTRIC AIR CONDITIONING SYSTEMS

Filed Dec. 30, 1964 3 Sheets-Sheet 2

Inventor:
Alwin B. Newton
By: Thomas B. Hunter
Atty.

Ts = 40°F

Ts = 60°F

INVENTOR.
ALWIN B. NEWTON

BY

ATTORNEY

United States Patent Office 3,252,504

Patented May 24, 1966

3,252,504

THERMOELECTRIC AIR CONDITIONING SYSTEMS

Alwin B. Newton, Spring Garden Township, York County, Pa., assignor to Borg-Warner Corporation, a corporation of Illinois Filed Dec. 30, 1964, Ser. No. 425,670
9 Claims. (Cl. 165—2)

This application is a continuation-in-part of application Serial No. 229,945, filed on October 11, 1962, now abandoned.

This invention relates to an air conditioning system employing thermoelectric means for heating and cooling. More particularly, the invention relates to an air conditioning system adapted to condition a plurality of enclosures which may be thermally isolated from each other and subject to varying external or atmospheric temperature conditions and varying demand conditions in the enclosures.

Upon the commercial appearance of thermoelectric materials of fairly high efficiency, utilizing the well known Peltier effect, thermoelectric devices have gained acceptance as fluid conditioning elements. Presently, thermoelectric conditioning devices are capable of being used in nearly all environments formerly conditioned by conventional refrigeration or cooling systems and further exhibit utility in some environments not amenable to conditioning by conventional methods.

While the properties of individual thermoelectric modules, i.e., those elements which employ the basic Peltier effect to yield heating at one side and cooling at the other side, are fairly well understood, attempts to utilize a pluarlity of such modules in what may be characterized as a conditioning system have not met with complete success as regards utilizing the modules most efficiently. The reasons for this appear to stem from the great difference in operation between conventional heating or cooling apparatus and the newer thermoelectric apparatus. Because of the great dissimilarity in the mode of operation of thermoelectric modules and conventional heating or cooling units, recourse to the prior art regarding the manner of construction and operation of a conditioning system in order to obtain maximum efficiency for the entire system has not been fruitful. Hence, workers in the thermoelectric conditioning art have been compelled to design conditioning systems with the newer thermoelectric conditioning modular units for maximum efficiency in various ways, many of which have failed to attain the highest possible efficiency.

According to the present invention, an air conditioning system yielding maximum efficiency is provided and utilizes the particular characteristics of thermoelectric conditioning modules in order to obtain the desired maximum efficiency.

It is therefore an object of the present invention to provide an air conditioning system for a plurality of enclosures thermally isolated from each other which takes advantage of the particularly characteristics of the thermoelectric modules employed to obtain maximum efficiency.

It is a further object of the present invention to provide an air conditioning system employing thermoelectric units for heating and cooling wherein each enclosure in a plurality of thermally isolated enclosures may be set at any desired temperature and the temperature effect on the sink of the heat abstract or heat rejected conditions the sink temperature for further heat abstraction or rejection by other units.

It is a further object of the present invention to provide an air conditioning system employing thermoelectric conditioning means which include at least one thermoelectric unit in each of several enclosures thermally isolated from each other, which employs means to alternately heat or cool forced convection fluid which communicates with the sink side of the units.

It is a further object of the invention to provide an air conditioning system for providing a desired temperature in each one of a plurality of enclosures, either heating or cooling as the individual loads thereof vary, each conditioning unit functioning independently of conditioning units in the other enclosures.

It is a further object of the present invention to provide an air conditioning system employing thermoelectric conditioning means wherein the power delivered to the various thermoelectric units of a plurality of thermoelectric units is changed upon the demand placed upon the individual modules to thereby attain maximum efficiency.

It is a further object of the invention to provide an air conditioning system employing a plurality of thermoelectric conditioning units in a plurality of enclosures wherein the power input to the individual units is varied in accordance with momentary needs to thereby achieve maximum system efficiency.

These and other objects and advantages will be apparent from the following description.

Figures 1, 8:
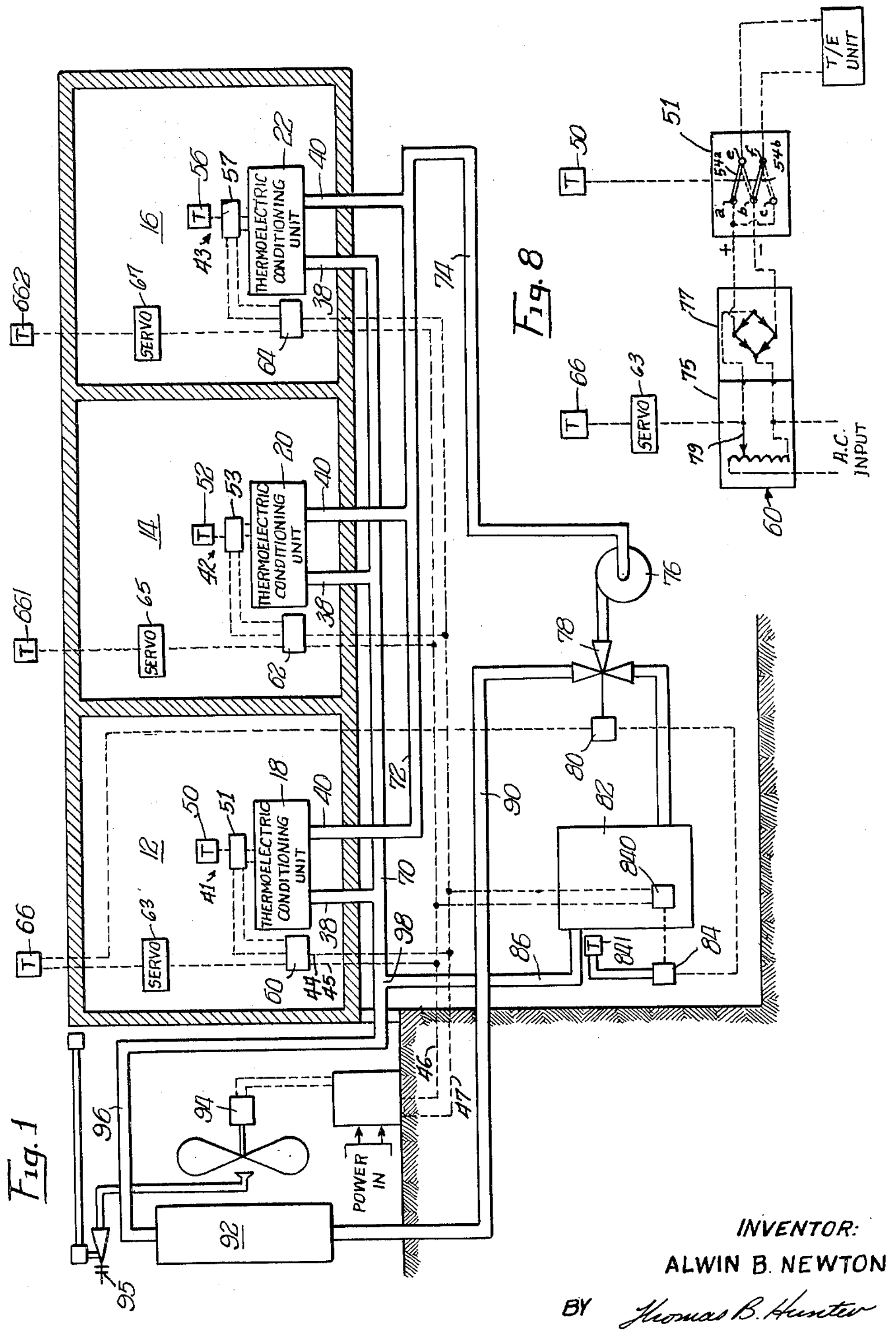
FIGURE 1 is a schematic view illustrating the system of this invention.
Figure 7:
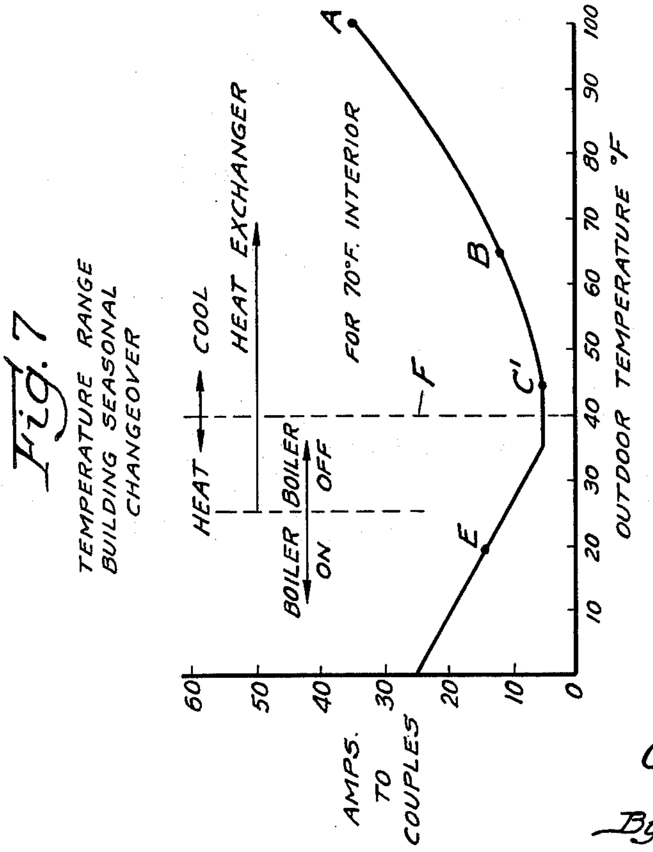

FIGURES 3 to 6 inclusive show the performance characteristics for typical thermocouples at various sink side temperatures $T_S$;

FIGURE 7 shows the relation between the boiler operation and the heat-exchanger operation of the system of this invention for a particular building; and FIGURE 8 is a more detailed schematic drawing of the power supply units and the controls therefor.

Referring now to FIGURE 1 of the drawings, a building or other structure 10 provides a plurality of enclosures 12, 14 and 16 thermally isolated from each other. In practice, the enclosures may not be completely thermally isolated but the advantages accruing from this invention will be more apparent if this assumption is made. Further, enclosures 12, 14 and 16 are usually exposed to separately varying heating and cooling loads, as due to changes in weather, orientation, and time of day. Each enclosure is provided with one or more thermoelectric conditioning units, 18 of enclosure 12, 20 of enclosure 14, and 22 of enclosure 16. The units may assume any of several forms known in this art. Each enclosure, further, may be considered as a group of enclosures having some similar thermal loads tending to vary in unison or subject to substantially the same thermal conditions.

Figure 2:
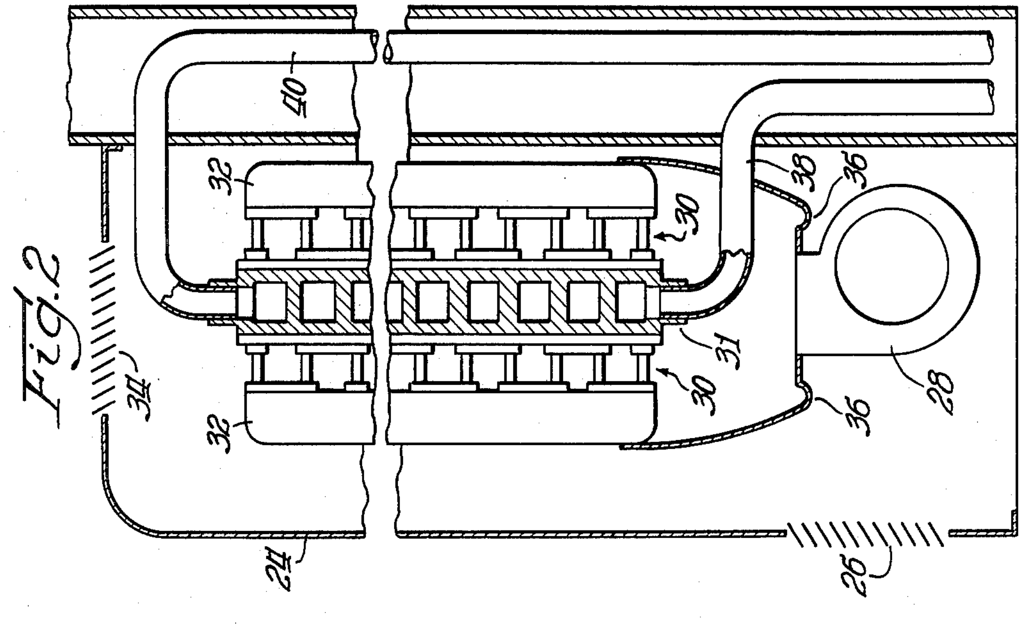
FIGURE 2 is a schematic view of one of the individual units of the system of FIGURE 1.

Referring now to FIGURE 2 of the drawings, each individual conditioning unit is enclosed in a suitable housing 24, preferably of sheet metal, having an intake louver 26 communicating with a fan or blower 28 which blows the air which is to be conditioned upwardly to conventional thermocouples 30 each having fins 32 in thermal contact with one side of the respective thermocouple and over which passes the air from blower 28 and thence to exit louver 34 for discharge of the now conditioned air into the enclosure. If desired, condensate receiving troughs 36 may be associated with each thermocouple 30 for carrying away any condensate formed. Conduits 38 and 40 communicate with heat sink 31 in contact with thermocouples 30 and a circulating fluid, whose function is to be more fully described hereafter, passes in the lower conduit 38 and exits through upper conduit 40. When the enclosure containing the unit is to be cooled, the fluid through conduits 38 and 40 will carry away the heat liberated from the unit, and when the enclosure requires heating, the fluid will supply heat to the unit.

Located interiorly of each enclosure are a plurality of temperature responsive means 41, 42, 43 associated with one or more of the conditioning units within an enclosure, for controlling the power supplied to the units from a power supply described in more detail below. Each temperature responsive means, which will sometimes be referred to as a thermostat, comprises a temperature sensing means 50, 52, 56 and suitable reversing switches 51, 53, 57 cooperating therewith to provide three-position thermostats, i.e., heating-off-cooling, which may be manually set for any desired temperature. These thermostats are constructed to pass current in either direction through the associated thermoelectric units 18, 20 and 22 to either heat or cool the respective enclosures depending upon the direction of current therethrough. As will be explained in more detail below, if the enclosure temperature falls below the setting, the thermostat will call for heating and unidirectional current passes through the associated thermoelectric unit in one direction. Conversely, when the enclosure temperature rises sufficiently above the setting, the thermostat is operative to reverse the direction of the current to provide cooling.

The numerals 60, 62 and 64 denote power supply units associated with the units in enclosures 12, 14 and 16 respectively. The power supply units are each coupled to an exterior thermostat (66, 661 and 662 respectively) located exteriorly of the plurality of enclosures.

As shown in FIGURE 8, power supply units 60, 62 and 64 each comprise a variable A.C. voltage supply unit 75 capable of producing an A.C. output voltage ranging from 0 to 100% of the A.C. input voltage, and an A.C. to D.C. converter or rectifier 77. Voltage supply units 75 may take the form of a continuously adjustable, variable auto-transformer, such as described in U.S. Patent 2,009,013 issued to Tuttle et al. on July 23, 1935 or one of various types of solid state power supplies such as described for example in U.S. Patent 3,131,545, issued to Gross et al. on May 5, 1964. In any event, these variable voltage supplies are not of the rheostat type which dissipate power through a variable resistance and therefore involve a considerable amount of $I^2R$ energy losses. While no transformer is 100% efficient, the economy of operation provided by the present invention depends on using only as much electrical energy as required for operation of the thermoelectric units.

A.C. electrical energy is brought into each power supply unit through branch conductors 44, 45 which are connected between the main power supply conductors 46, 47 and the input side of variable transformer 75. The output voltage, which is determined by the position of a movable slider 79, is conducted to the A.C. to D.C. converter or rectifier 77 and then supplied to the thermoelectric units through switch mechanism 51 operated in response to room temperature.

The position of the slider 79 in each of the variable transformers is controlled in response to ambient temperatures as sensed respectively by thermostats 66, 661 and 662 through the operation of any suitable type of servo mechanisms 63, 65, 67. One type of control which may be utilized is a temperature responsive proportional controller including a capillary bulb sensing outside ambient air conditions, said controller having a mechanical output, e.g. a bellows or Bourdon tube, which operates a potentiometer in one leg of a bridge circuit. Unbalancing of the bridge circuit causes movement of a servo motor output which, in turn, moves the slider 79 in the variable transformer. An example of a proportional temperature controller which may be employed is a unit manufactured by Minneapolis Honeywell and designated as model T 915 C. The servo mechanism is likewise standard equipment and may take several forms. It will be understood that this control system as described is just one example of many various types of controllers such as hydraulic, pneumatic, and others, each of which may take a multitude of varying forms within a given class.

For reasons which will be apparent from the description below, the thermal sensing means 66, 661, 662 each cooperate with their respective variable power supplies such that full power is available to the thermoelectric conditioning units for both maximum heating and maximum cooling load conditions. In the system described, this could be achieved by means for varying the movement of the potentiometer in the bridge leg so that at high outdoor ambient temperatures, e.g. 100° F., maximum voltage will be applied across said leg, and the voltage will be gradually reduced to a point corresponding to an outside ambient temperature of approximately 40° F. The voltage would then begin to increase again as the temperature drops, reaching a maximum again at approximately 0° F. The servo mechanism output could then be arranged to follow the bridge leg voltage and produce a corresponding A.C. voltage output from the variable transformer.

Each of the switch sections of the thermostats provided by thermal sensing means 50, 52, 56 and associated switch mechanisms 51, 53, 57 preferably comprises a two-pole, double throw switch with one contact in common. The switch arms **54*a* and 54*b*** are moved simultaneously from the solid line position, connecting contacts *a* and *b* with terminals *e* and *f*, to a dotted line position, connecting contacts *b* and *c* with terminals *e* and *f*. The thermal sensing element is effective to move the switch arms between one set of contacts and a no-contact position during periods when, say cooling is required, and between an intermediate no-contact position and the opposite contact position when heating is required.

The numeral 70 denotes a common supply conduit to each of the conduits 38 (note FIGURE 2) associated with the thermoelectric conditioning units and the numeral 72 denotes a common return conduit connected to conduits 40 (note FIGURE 2) of the individual thermoelectric units. A fluid conduit 74 communicates with the common conduit 72 and leads to the inlet of pump 76 whose output is fed directly into a three-way valve 78 actuable by any well known control means 80. One of the two outputs of three-way valve 78 leads directly to a boiler 82 whose output is fed by conduit 86 to supply conduit 70. Numeral 84 denotes any conventional temperature sensing device which senses the temperature of the fluid exiting from boiler 82. The numeral 90 denotes a conduit connected to the second output of three-way valve 78, the other end of the former communicating with a cooling tower or a heat-exchanger 92 having a fan 94 and associated means 95 to wet the surface of 92 when desired. The output of heat-exchanger 92 is fed through conduit 96 to common supply conduit 70 through connection or junction 98. The heat-exchanger is located exteriorly of the plurality of the enclosures 12, 14 and 16, preferably in the exterior air. Suitable one-way check valves (not shown) may be provided in lines 86 and 96 to insure flow in the proper direction when three-way valve 78 is switched from one position to another.

The operation of the system so far described will now be given and, for purposes of clarity, individual descriptions will be given for four different operating conditions.

*Hot ambient—All enclosures call for cooling*

Assume the ambient temperature to be 100° F. exteriorly of the plurality of enclosures 12, 14 and 16 with a correspondingly high wet-bulb temperature of 80° F. Assume further that the temperature desired in all the enclosures is 70° F. With this set of operating temperatures, the fluid within the common conduit 70 which enters the sink circuit of each thermoelectric unit 18, 20 and 22 will be heated by the modules within the units whose thermostats 41, 42, and 43 are then requiring corresponding units to cool the air passing over unit fins 32, i.e., the fan 28 in each unit will blow air over the fins 32, on the load side, from which heat is absorbed, while the opposite or sink side of the modules in contact with the heat sink 31 will receive the heat so removed from the air, in turn heating the circulating fluid. The entering heat exchange fluid passing through conduit 70 will have been cooled by circulation through the heat-exchanger 92 to some temperature above the ambient wet-bulb, say to 87° F., valve 78 being positioned to pass the output of pump 76 to conduit 90 in response to the measurement of the high 100° F. ambient by thermostat 66, which actuates control means 80, to cause pump 76 to force the sink fluid through the heat-exchanger 92. The sink circuit receives any heat made available within the individual units and is thereby warmed, and, at a relatively high load such as represented by the 100° F. outdoor ambient and 80° F. wet-bulb temperature, the fluid in conduit 70 may be expected to be heated about 10° F. to say 97° F. It should be noted that each thermoelectric conditioning unit 18, 20 and 22 receives power for the required cooling action through power supply units 60, 62 and 64 only when its corresponding thermostat 41, 42 or 43 measures a room temperature above its preset "off" temperature, i.e., a point intermediate the cooling and heating positions. Thus, not all units need operate simultaneously, but the average rise in the sink water temperature may be assumed to be 10° F. under this load condition.

Outdoor thermostats 66, 661 and 662, by sensing the high outdoor ambient of 100° F., determine that the power input levels of power supply units 60, 62 and 64 should be at a maximum, and therefore the latter make maximum power available to their corresponding conditioning units. Each thermostat 41, 42, and 43 therefore controls maximum power input to its particular unit, thus providing maximum cooling whenever it requires cooling.

Figure 3:
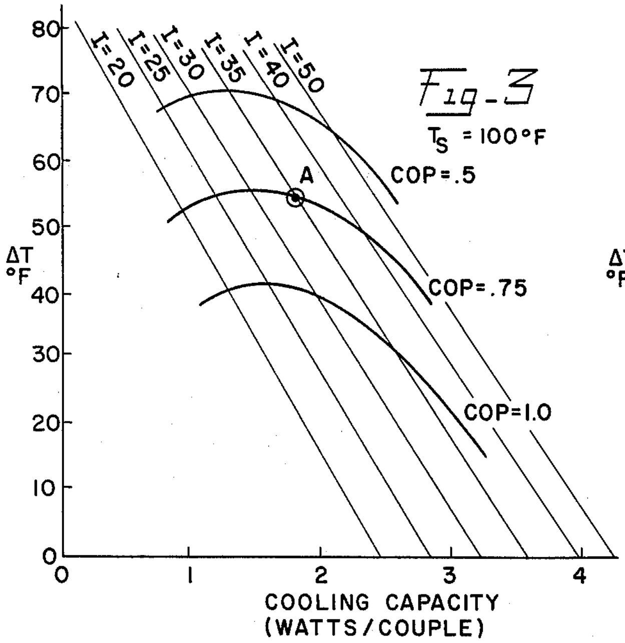

Under these conditions the sink side or hot junctions of thermocouples 30 may be expected to have an average temperature of 100° F. Reference now to FIGURE 3 (which shows the performance characteristics for typical couples at a sink side temperature, $T_s$, of 100° F.) at point A shows that with the cold side of the modules at 45° F., corresponding to $\Delta t$ across the couple of 55° (100–45) and electrical input of 35 amperes produces a cooling effect of 1.90 watts for each thermocouple with a C.O.P. (coefficient of performance) of .75. This corresponds to 4.62 kw./t. of cooling.

The performance charts shown in FIGURES 3–6 are intended to represent the performance characteristics of typical thermoelectric couples in order to illustrate operations under various conditions. The length to area ratio of the couples used to generate this data was approximately 0.8, but it will be appreciated that performance characteristics vary to some extent, depending on the composition of the semi-conductor elements, quality control, L/A ratio, etc. The term "cofficient of performance" (C.O.P.) is a measure of the heat pumping efficiency and is defined as the ratio of the heat pumped (either removed or added to the load) to the energy used in pumping said heat.

*Warm ambient—Various loads in different enclosures*

Assume an external ambient of 65° and that the temperature of each enclosure such as 12, 14 and 16 is to be maintained at 70° F. With this set of operating conditions, some enclosures, say 12 and 16 which may be exposed to the exterior of the building, will require less cooling than enclosures such as 14 which may only be exposed to other enclosures within the building. The cooling action is similar to that just described, but the fluid within the common conduit 70 will receive less heat and therefore the temperature rise will be lower for reasons yet to be described. At the lower ambient temperature exteriorly of the building, the wet-bulb temperature will be lower, say at 55° F., and since the circulation of the sink fluid flow is still to the heat-exchanger 92, the sink fluid will be returned to the building at a lower temperature such as 63° F. The average heat added may be less than half than that added under the previous condition, so the temperature rise may be only 4° F. to result in a return temperature in conduit 90 of 67° F.

Outdoor thermostats 66, 661 and 662 now sense a lower temperature, 65° F., and thus require the power supply units 60, 62 and 64 to supply power at a reduced level, it being understood that the power supply units may operate independently of each other. Thus the operating cycle of each conditioning unit is lengthened proportionately, but at the same time, its thermoelectric elements operate at a lower electrical input or amperage and thus more efficiently.

Figure 4:
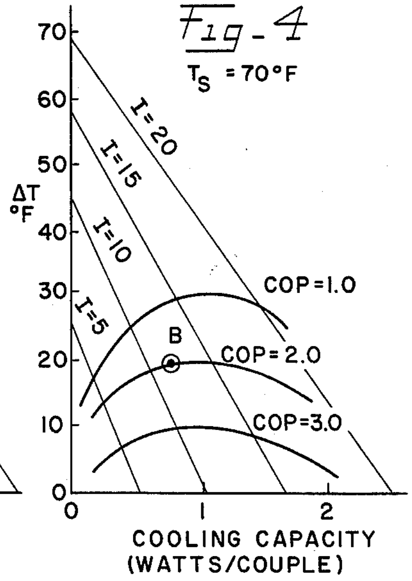

Under these conditions, the sink side or hot junctions at the thermocouples may be expected to have an average temperature of 70° F. Reference to FIGURE 4 (which shows the performance characteristics for typical thermocouples at a sink side temperature $T_s$, of 70° F.) at point B shows that with the cold side of the modules at 50° F., corresponding to $\Delta t$ across the thermocouple of 20° F. (70–50), an electrical input of 12 amperes produces a cooling effect of .80 watt for each thermocouple with C.O.P. of 2.0. This corresponds to 1.76 kw./ton of cooling.

*Cooler Ambient—Some enclosures need heat and others cooling*

Assume now that the external ambient temperature is 45° F. and that the temperature of each enclosure such as 12, 14 and 16 is still to be maintained at 70° F. With this set of operating conditions some enclosures such as 12 and 16 will need heating, whereas others such as 14 may still require cooling. The condition under which the total heat needed by rooms now requiring heat approximately equals the amount of cooling needed by the summation of demand of rooms on the cooling cycle is being approached, and therefore the temperature of sink fluid in conduit 70 will be lowered by passing through some units, but heated while passing through others, the net result being, for example, to heat the fluid a net amount of 1° F. indicating that the cooling load slightly exceeds the heating load for the enclosures. If the outside wet-bulb temperature is 38° F. the fluid in conduit 70 may be at 39.5° F. while that in conduit 90 may be 40.5° F.

Figure 5:
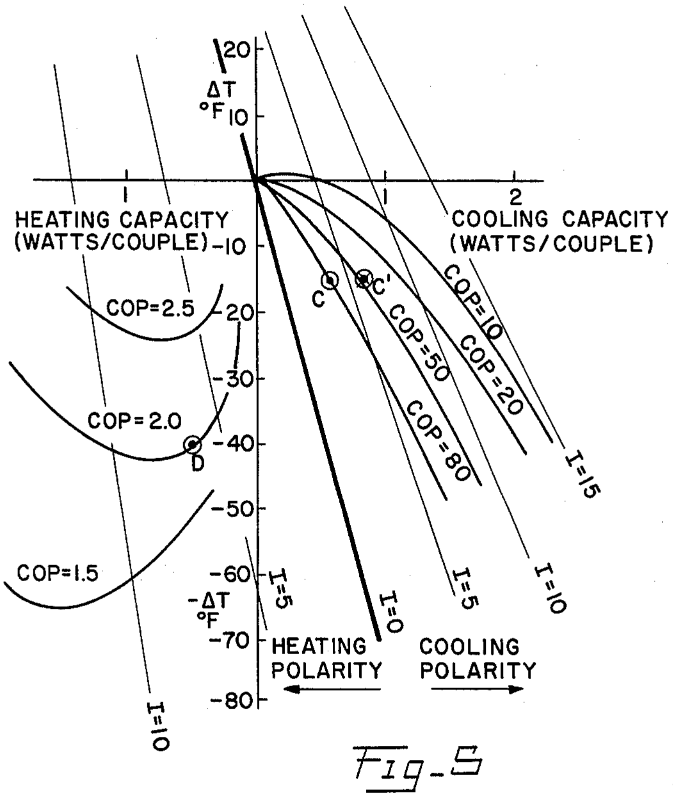

The outdoor temperature is now very close to the season changeover temperature for the building, as represented by temperature (F.) in FIGURE 7. Outdoor thermostats 66, 661 and 662 now sense the lower temperature, 45° F., and thus require power supply units 60, 62 and 64 to supply a still lower level of power to thermoelectric units 18, 20 and 22. Thus the operating cycle is lengthened again proportionately to the reduction in voltage or power, and each unit still operates at a satisfactorily long cycle and at still further improvement in efficiency. The sink side or hot junction of the thermocouples may be expected to have an average temperature of close to 40° F. Reference to FIGURE 5 (which shows the performance characteristics for typical thermocouples at a sink side temperature, $T_s$, of 40° F.) at point C shows that with the cold side of the modules at 55° F., corresponding to $\Delta t$ across the thermocouple of −15° F. (40–55) an electrical input of 3 amperes produces a cooling effect of .6 watts for each thermocouple with a C.O.P. of 80. This corresponds to .042 kw./ton of cooling.

Those units operating on heating will also have an average $T_s$ close to 40° F., but require a hot side junction of approximately 80° F. to heat the enclosures 12, 14 and 16. Reference again to FIGURE 5 shows that at this −40° $\Delta t$ a minimum current of 6.5 amperes is required for .5 watts/couple heating at C.O.P. of 2.0.

Since 6.5 amperes is required for heating, the minimum current (note the flat part of the curve of FIGURE 7) will be chosen at 6.5 amperes and therefore the actual operating condition of the cooling unit in this case will be as shown in C′ in FIGURE 5, corresponding to 6.5 amperes, .85 watt of cooling per thermocouple at a C.O.P. of 45, requiring .08 kw./ton of cooling. Under this condition thermostats in the enclosures requiring cooling will cycle their corresponding units for shorter cooling periods to maintain the desired enclosure temperature of 70° F.

In general the choice of minimum current at season changeover conditions should be made at a high enough value to force point D in FIGURE 5 to be nearly at the valley of the corresponding C.O.P. curve, or preferably even to the left of the valley. The position of D in FIGURE 5 as shown is acceptable, but had it fallen a much greater amount above the lowest point, or valley, of the C.O.P. curve, the current applied would have been further increased to achieve a closer approach to the valley or pass beyond it. Such choices are made to meet the conditions required by each building, and in an extreme case where a proper choice of heating current would result in too great a loss of efficiency in units left on the cooling cycle, switching means (not illustrated) associated with each power supply unit 60, 62 and 64 may provide a recirculating of the thermoelectric elements in the thermoelectric units 18, 20 and 22 placed on heating to reduce the number of modules in each circuit internal to thermoelectric units 18, 20 and 22, so that with the same applied voltage they will carry a greater current than when the units are required to cool.

It should be noted that these same conditions will exist at lower outdoor ambients with continual improvement of C.O.P. in those enclosures which need cooling, but with a gradual reduction of C.O.P. for heating unless the current is increased. Because of this reduction of the heating C.O.P. and the increasing predominance of the heating vs. the cooling requirement with lower outdoor ambients it is preferred to operate at lower temperatures as described in the following:

In the foregoing example, thermoelectric sink side temperature for both heating and cooling have been averaged at 40°, whereas in practice $T_s$ for units performing a cooling function will rise slightly above 40°, and $T_s$ for units performing heating will drop slightly below 40°. However, the net results described are still obtained.

*Cold ambient—All or most enclosures need heat*

Assume now an external ambient of 20° F. Under this condition all enclosures are assumed to need heating most of the time. Thermostat 66 senses the low ambient and repositions three-way valve 78 through control 80 to stop the flow of sink fluid through the heat-exchanger 92 and cause it to flow through the boiler 82. Operation of the valve control 80 causes an auxiliary switch thereon to energize a control circuit to the burner of the boiler through temperature sensing device 84 thereby actuating burner control 840. The boiler now heats the sink fluid to a convenient temperature under the temperature sensing device 84 such as 60° F., at which heating is done very efficiently as needed, but cooling is still possible with good efficiency should it be needed in any space as might be caused by excessive internal loads. Bulb sensor 841, coupled to temperature sensing device 84, controls, by sensing the temperature of boiler output fluid in conduit 86, the amount of heating required from the boiler.

Thermostats 66, 661 and 662, sensing the new ambient, 20° F., now call for the power level of power supply units 60, 62 and 64 to increase slightly from the last described case as will be seen by reference to point E of FIGURE 7.

This completes the description of the four different operating conditions.

FIGURE 7 illustrates the relation between boiler operation, power level, and heat-exchanger operation for a particular building. It will be understood that not only might the changeover temperature (F.) be different for different buildings and different latitudes, but also the curve itself may vary. To understand the figure, assume the ambient external temperature to be 100° F. For the particular (exemplary) building herein described, an external ambient at 100° F. requires the availability of 35 amperes to each conditioning unit to maintain the enclosure temperature at 70° F. and the sink fluid is cooled by the heat-exchanger 92. For an external ambient of 20° F., the sink fluid is heated by the boiler, 14 amperes being available to each conditioning unit to maintain the enclosure temperatures at 70° F.

Figure 6:
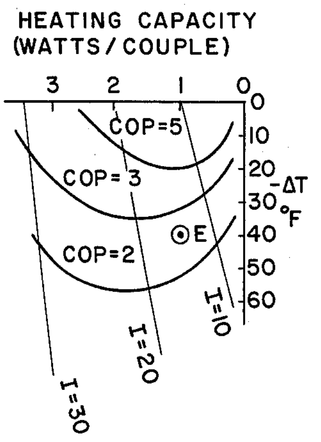

Under these conditions the sink side or hot junction of the thermocouple may be expected to have an average temperature of 60° F. Reference to FIGURE 6 (which shows the performance characteristics during heating for a particular thermocouple at a sink side temperature, $T_s$, of 60° F.) at point E shows that with the hot side of the module at 100° F., corresponding to $\Delta t$ across the thermocouple of −40° F. (60–100) and an electrical input of 14 amperes produces a heating effect of 1.0 watt per thermocouple. At still lower ambients the power level would now be further increased to enable each unit to have sufficient capacity but each increase results in some unavoidable reduction of C.O.P. At the 20° F. external ambient the operating C.O.P. may be 2.6 as shown by point E in FIGURE 6, corresponding to approximately one watt per couple.

The external ambient at which thermostat 66 changes the position of three-way valve 78 may be adjusted for the most favorable conditions for each installation and location. In many situations best results are obtained by continuing to pick up heat through heat-exchanger 92 even at relatively low ambients, such as 20° F. or lower. In such cases the spray of water onto the heat-exchanger for evaporative cooling purposes is discontinued at an ambient temperature above 32° F. and the heat-exchanger operates in a dry condition to avoid freeze-up.

In colder climates it may also be desirable to raise the temperature provided in the heat sink fluid by the heat input of the boiler at lower ambients so that some of the enclosure heating effect is secured by direct heat transfer from the sink fluid, say at 100° or more for a 0° ambient, and higher for still lower ambients, this heat transfer being conducted through the thermoelectric elements even when no electric current is connected to a given unit. However, the amount of heat so transferred should not be quite sufficient to maintain the room temperature, and the thermostats 41, 42 and 43 control power as needed to pump heat through the elements from the sink into the room air streams.

From the above discussion of the four external ambient conditions it is seen that as the external temperature varies from a rather high value to a rather low value, the power level available to each thermoelectric conditioning unit varies and thus takes advantage of the variation of characteristics of thermocouples to control the power level supplied to them in a manner to achieve maximum overall seasonal efficiency.

It is to be noted that in lieu of utilizing one of the external thermostats such as 66 for operating the three-way valve 78 control means 80, a temperature comparing device may be inserted between conduits 70 and 74 and the temperature differential therebetween used to actuate three-way valve 78. Such a comparing device would sense a reversal of the relative temperatures between conduits 70 and 74, upon changes such as changes in external ambient or internal heating, and upon a reversal of sufficient magnitude, the valve would be actuated.

While this invention has been described in connection with certain specific embodiment thereof, it is to be understood that this is by way of illustration and not by way of limitation; and the scope of this invention is defined solely by the appended claims which should be construed as broadly as the prior art will permit.

What is claimed is:

1. A thermoelectric air conditioning system comprising a plurality of thermoelectric conditioning units, each said conditioning unit having a load side in thermal communication with one of a plurality of enclosures to be conditioned and a corresponding sink side thermally communicating with a liquid path, said liquid paths each having an inlet and an outlet; a common conduit interconnecting said inlets; a common conduit interconnecting said outlets; pump meas for circulating a heat-exchange fluid through said liquid paths and common conduits; means for heating said heat-exchange fluid; means for cooling said heat-exchange fluid; conduit means connecting said heating means and said cooling means with said common conduits; valve means for directing said heat-exchange fluid to said heating means, or alternately to said cooling means; means for actuating said valve means; an individual electrical power supply unit associated with said conditioning units in each enclosure; temperature responsive means associated with each of said enclosures and being located exteriorly thereof, each of said temperature responsive means being coupled respectively to each of said separate power supply units; means actuated by said temperature responsive means for varying the power level output of each said power supply unit in response to the temperature sensed by each exterior temperature responsive means; an interior temperature responsive means associated with the thermoelectric conditioning units in each enclosure; and means for controlling the power transmitted from said power supply units to said thermoelectric conditioning units in response to the temperature sensed by said interior thermostat, whereby the power level fed to each said conditioning unit varies as the external ambient temperature and whereby the availability of power fed to each individual conditioning unit varies as the temperature of its associated enclosure.

2. A system as defined in claim 1, including temperature responsive means sensing outside ambient air temperature for operating said valve actuating means, said last-named temperature sensing means being effective to move said valve means to a position to direct said heat exchange medium to said heating means when said ambient temperature falls below some predetermined value.

3. A system as defined in claim 2, wherein means responsive to actuation of said valve means initiates operation of said heating means.

4. A method of thermoelectrically conditioning an enclosure having a thermoelectric conditioning unit therein including the steps of sensing the temperature exteriorly of the enclosure, continuously modulating the power level available for supply to said thermoelectric conditioning unit in accordance with variations in temperature outside of said enclosure, and selectively coupling and decoupling the modulated power to said conditioning unit in accordance with a desired internal enclosure temperature, whereby maximum efficiency of the thermoelectric conditioning unit is realized for each external temperature.

5. A method of operating a thermoelectric air conditioner provided with a heat sink, including the steps of varying the power level fed to the thermoelectric conditioner, supplying maximum power during periods when maximum cooling is required, thereby pumping maximum heat flux from a cold thermoelectric junction to a hot sink junction through a maximum temperature differential, supplying power at a reduced level during periods when there is a reduced demand for cooling, thus pumping a reduced heat flux from the cold thermoelectric junction to a hot sink junction at a reduced temperature differential, supplying power at a still reduced level while the temperature differential between the hot and cold junctions of the thermo-couple reverses to cause heat to be pumped from the cold junction to a colder sink junction, containing reductions in power input until the cooling requirement approaches zero and then reversing the polarity of the current fed the thermo-couples, supplying electrical power when minimum heating is required, thus pumping a heat flux from the cold sink junction to the warm thermoelectric junction of the thermo-couple through a low temperature differential, supplying increased electrical power during periods when increased heating is required, thus pumping an increased heat flux from the cold sink junction to a warmer thermoelectric junction of the thermocouples at an increased temperature differential.

6. The method of thermoelectrically conditioning an enclosure as set forth in claim 5 including the step of adding heat to the sink junctions of the thermo-couple in the thermoelectric unit to thereby raise the sink junction temperature to a predetermined level whenever a predetermined heating need exists.

7. An air conditioning system comprising a thermoelectric air conditioning unit in thermal communication with an enclosure to be conditioned; a continuously variable power supply for supplying unidirectional electrical energy to said conditioning unit; means responsive to the temperature level outside of said enclosure for modulating the power level of said unidirectional electrical energy; means for selectively coupling and decoupling said power supply to said conditioning unit, said means including a switch having a first position wherein said unidirectional electrical energy is supplied to said conditioning unit and a second position wherein the flow of said unidirectional electrical energy is interrupted; and means responsive to the temperature level inside said enclosure for actuating said switch between said first and second positions.

8. An air conditioning system as defined in claim 7 wherein said switch further includes a third position wherein the unidirectional electrical energy supplied to said conditioning unit is reversed to effect a reversal of the function of said thermoelectric air conditioning unit.

9. An air conditioning system as defined in claim 7 including a plurality of thermoelectric air conditioning units, at least some of said units being associated with separate enclosed spaces to be conditioned, each said unit including a thermoelectric heat pumping element having a load side thermally communicating with the corresponding enclosed space to be conditioned and a sink side thermally communicating with a fluid path; a fluid inlet and a fluid outlet communicating with each of said fluid paths; a common conduit interconnecting said fluid inlets; a common conduit interconnecting said fluid outlets; a heat exchanger connected between said common conduits to provide a closed circuit fluid circulation system; pump means for circulating a heat exchange fluid through said circuit; and means for varying the temperature of said heat exchange fluid in response to the cooling and heating requirements of said system.

References Cited by the Examiner

UNITED STATES PATENTS

| | | | |
|---|---|---|---|
| 2,715,514 | 8/1955 | Stair. | |
| 2,949,014 | 8/1960 | Belton et al. | 62—3 |
| 2,998,707 | 9/1961 | Mess et al. | 62—3 |
| 3,040,538 | 6/1962 | Alsing | 62—3 |
| 3,085,405 | 4/1963 | Franti | 62—3 |
| 3,123,980 | 3/1964 | Steimel | 62—3 |

JAMES W. WESTHAVER, *Primary Examiner.*

CHARLES SUKALO, *Examiner.*